(12) United States Patent  
Patrini

(10) Patent No.: US 8,377,367 B2
(45) Date of Patent: Feb. 19, 2013

(54) METHOD FOR PRODUCING A CONTAINER FOR USE WITH AN AIRLESS PUMP

(75) Inventor: Orsola Patrini, Capergnanica (IT)

(73) Assignee: Lumson S.p.A., Capergnanica (IT)

( * ) Notice: Subject to any disclaimer, the term of this patent is extended or adjusted under 35 U.S.C. 154(b) by 147 days.

(21) Appl. No.: 13/049,574

(22) Filed: Mar. 16, 2011

(65) Prior Publication Data

US 2011/0227258 A1 Sep. 22, 2011

(30) Foreign Application Priority Data

Mar. 17, 2010 (IT) .............................. MI2010A0435

(51) Int. Cl.
*B29C 49/22* (2006.01)

(52) U.S. Cl. ........ 264/510; 264/511; 264/516; 264/535; 264/571

(58) Field of Classification Search .................. None
See application file for complete search history.

(56) References Cited

U.S. PATENT DOCUMENTS

| | | | |
|---|---|---|---|
| 3,420,413 A | 1/1969 | Corsette | |
| 4,691,847 A | 9/1987 | Ford et al. | |
| 4,694,977 A | 9/1987 | Graf et al. | |
| 5,043,130 A | 8/1991 | Fujio | |
| 5,921,416 A | 7/1999 | Uehara | |
| 5,971,224 A | 10/1999 | Garibaldi | |
| 8,167,171 B2 * | 5/2012 | Moretti | ............................ 222/95 |
| 2004/0112921 A1 | 6/2004 | Nomoto et al. | |
| 2005/0023185 A1 | 2/2005 | Ramet | |
| 2008/0011778 A1 | 1/2008 | Ronsin et al. | |
| 2010/0044393 A1 | 2/2010 | Moretti | |
| 2010/0276447 A1 * | 11/2010 | Patrini | ........................ 222/105 |
| 2011/0174764 A1 * | 7/2011 | Moretti | ........................ 215/379 |

FOREIGN PATENT DOCUMENTS

| | | |
|---|---|---|
| EP | 0 763 469 A1 | 3/1997 |
| FR | 2 676 958 | 12/1992 |
| FR | 2 902 083 | 12/2007 |
| FR | 2 916 674 | 12/2008 |
| JP | 5-31790 | 2/1993 |
| JP | 5-31791 | 2/1993 |
| WO | 2009/047021 | 4/2009 |

OTHER PUBLICATIONS

U.S. Appl. No. 13/005,307, filed Jan. 12, 2011 (specification enclosed).

* cited by examiner

*Primary Examiner* — Monica A Huson
(74) *Attorney, Agent, or Firm* — Novak Druce Connolly Bove + Quigg LLP

(57) ABSTRACT

A method for producing a container associable with airless pumps, in the interior of which container a deformable bag is formed by blow molding a preform of plastic material. A vacuum is created in the container interior during or slightly before blowing.

14 Claims, 4 Drawing Sheets

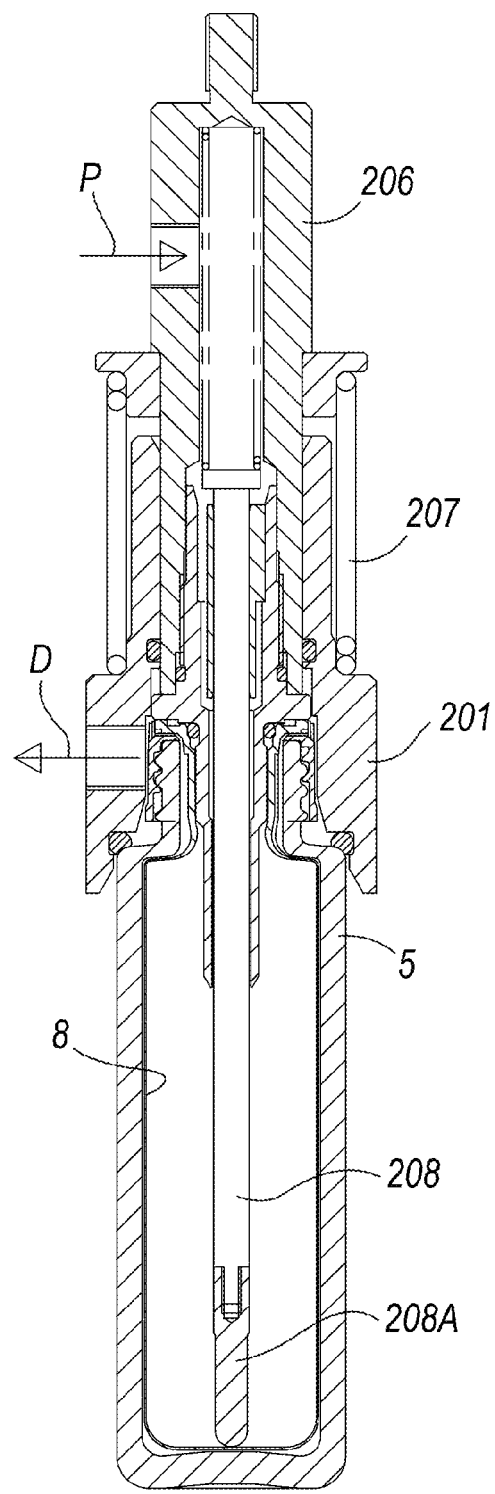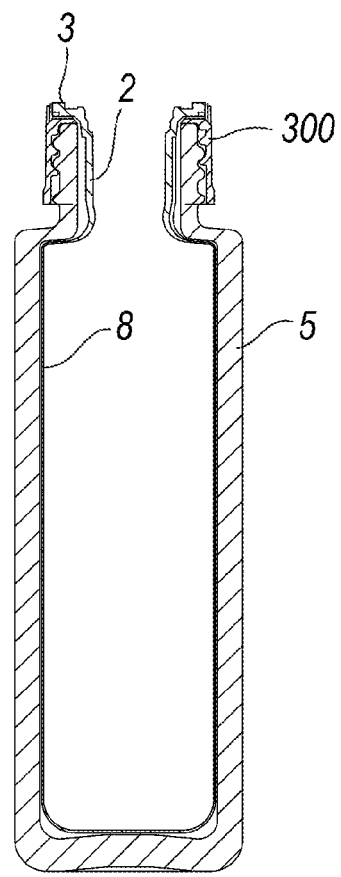
*Fig. 5*
*Fig. 6*

METHOD FOR PRODUCING A CONTAINER FOR USE WITH AN AIRLESS PUMP

CROSS-REFERENCE TO RELATED APPLICATION

This application claims priority from Italian patent application no. MI2010A000435 filed Mar. 17, 2010.

The present invention relates to a method for producing a container associable with a manually operable pump for dispensing fluid substances contained under airtight conditions in a deformable bag housed in a rigid body.

It is known to enclose fluid substances (both liquid and creamy) in containers from which these substances are dispensed by manually operating a small pump mounted on the mouth of a respective container.

Pump operation causes a quantity of fluid substance to be withdrawn from the container in which—if the container is rigid—a vacuum forms which would prevent further substance withdrawal and dispensing, if air were not allowed to enter the container (which generally takes place in those regions in which the pump makes contact with and slides on the pump body), or if the container did not comprise a base sealedly movable along an internal cylindrical surface of the container (see for example U.S. Pat. No. 4,691,847, U.S. Pat. No. 4,694,977 and U.S. Pat. No. 5,971,224): this latter system for compensating the container volume by reducing its internal volume while maintaining the internal pressure constant is however very laborious and costly.

In many cases it is opportune or necessary that the fluid substance to be dispensed by a pump never comes into contact with the atmosphere inside the container (with the dispensing pump mounted on it): sealing the fluid out of contact with the atmosphere is important if the composition of the fluid within the container is not to undergo alteration, or if it is essential that the fluid substance enclosed in the container remains sterile. To achieve this, U.S. Pat. No. 3,420,413 has proposed a device comprising a bag containing the fluid substance which is to remain isolated (from the atmosphere) inside the bag, which (see column 4, lines 22-28) is made of elastically deformable flexible material and has a neck on which a support element (having a profiled aperture for housing a pump) is sealedly applied after the bag has been filled with the fluid substance to be dispensed: after this, a pump is sealedly mounted on said support element to hence prevent contamination of the fluid substance by the air (column 5, lines 15-38). The bag containing the fluid substance and having the pump sealedly mounted on its neck is then inserted into a rigid body (obviously being very careful that the free end of the rigid body does not come into contact with the bag filled with fluid substance, in order not to rupture it) on which said support element is then positioned and fixed (column 5, lines 56-61). Hence between the outer surface of the bag and the inner surface of the rigid body an interspace is formed which is connected to atmosphere via a hole provided in the container base; in this manner, when the fluid substance is withdrawn from the bag by operating the pump, the bag is squeezed by the atmospheric pressure so that the substance can be easily withdrawn and expelled to the outside by the pump (column 5, lines 70-73). The main drawback of the aforesaid device is that the deformable bag must be filled with fluid substance before the bag is inserted into the respective rigid container, and that the operation involved in inserting the bag into the container is very delicate because the bag can be easily torn while being inserted into the container interior.

JP 05 031790A and JP 05 031791A published on Sep. 2, 1993 describe how a bag of elastically deformable material can be produced directly within a rigid container. For this purpose an elongated preform (made of thermoplastic material and having an elongated hollow cylindrical body, open at one end where the preform presents a neck from which a flange radially projects) is inserted into a rigid container having a mouth from which a neck extends, on the free edge of which there rests the flange of the preform, which is heated, thrust towards the container base by a pusher and then inflated within the container, until a bag forms, the outer surface of which adheres (at least for a large part of its surface) to the inner surface of the container. The bag obtained in this manner also has a neck, at least an end portion of which presents outwardly projecting longitudinal ribs, with some radial ribs or projections projecting from that surface of the preform flange which faces the free edge of the neck of the container in which the bag is inserted: these ribs or projections define passages for the air which penetrates from the outside between the container and bag to enable this latter to flatten or inwardly deform during outward dispensing of the fluid substance through the pump, so preventing the formation inside the bag of a vacuum which would prevent dispensing of the fluid substance.

In particular, in the two Japanese patents the method used to inflate the preform does not enable the bag to be formed with homogeneous walls. In this respect, during inflation the bag does not form homogeneously, but at certain points it directly touches the external container. At the points at which the bag is in contact with the container a seal forms which prevents free evacuation of the underlying air, with the result that in the part below the contact zone a high pressure is created, making optimal bag inflation difficult. This is because the air escapes very slowly from the zone in which the seal is created, consequently the preform inflation pressure must be maintained for a considerable time. This influences the time required to form the container.

During this time the preform cools, risking non-optimal bag inflation, with the consequent risk of bag rupture and a non-homogeneous bag wall thickness.

FR 2 902 083 A1 discloses a container e.g. bottle and jar useful in the field of cosmetic, aesthetic and chemistry, comprises an external and an internal wall separated one another by an air film, and a neck with an external thread to cooperate with a plugging system. The walls are not solidarized with one another at an opening zone of the container. The air film has a thickness lower than the thickness of the walls. The neck is constituted by an extension of the internal wall and arranged to receive a pump without resumption of the air. The internal wall is made of a plastic material. The container e.g. bottle and jar useful in the field of cosmetic, aesthetic and chemistry, comprises an external and an internal wall separated one another by an air film, and a neck with an external thread to cooperate with a plugging system. The walls are not solidarized with one another at an opening zone of the container. The air film has a thickness lower than the thickness of the walls. The neck is constituted by an extension of the internal wall and arranged to receive a pump without resumption of the air. The internal wall is made of a plastic material. The external wall is made of a metal, glass or wood. The internal and external walls are made of opaque/transparent, rigid or flexible/rubbery thermoplastic material.

The external container provides passages for the evacuation of the air trapped between the internal container and the external container due to the expansion of the internal container during its blowing phase. Those passages allow the communication of the internal par of the external container with the environment. The passages are created in correspondence of the neck of the container between the external container and the internal container, and on the bottom of the container. Those passages allow the free expulsion of the air created during the blowing of the internal bag.

The main object of the present invention is therefore to provide a method for forming a deformable bag which is less subject to rupture during inflation and which perfectly occupies the entire volume of the cavity within which it is inflated.

The method of the present invention also enables the container to be produced more quickly compared with traditional methods.

These and other objects are attained by a device in accordance with the technical teachings of the accompanying claims.

The ensuing description illustrates a non-limiting embodiment of the device, which is indicated by way of non-limiting example; it is represented with the aid of the accompanying drawings, in which:

FIGS. 3 to 5 are sections showing the various steps in the process by which the deformable bag is formed;

FIG. 6 shows a container produced by the method of the present invention;

Figures 1, 2:
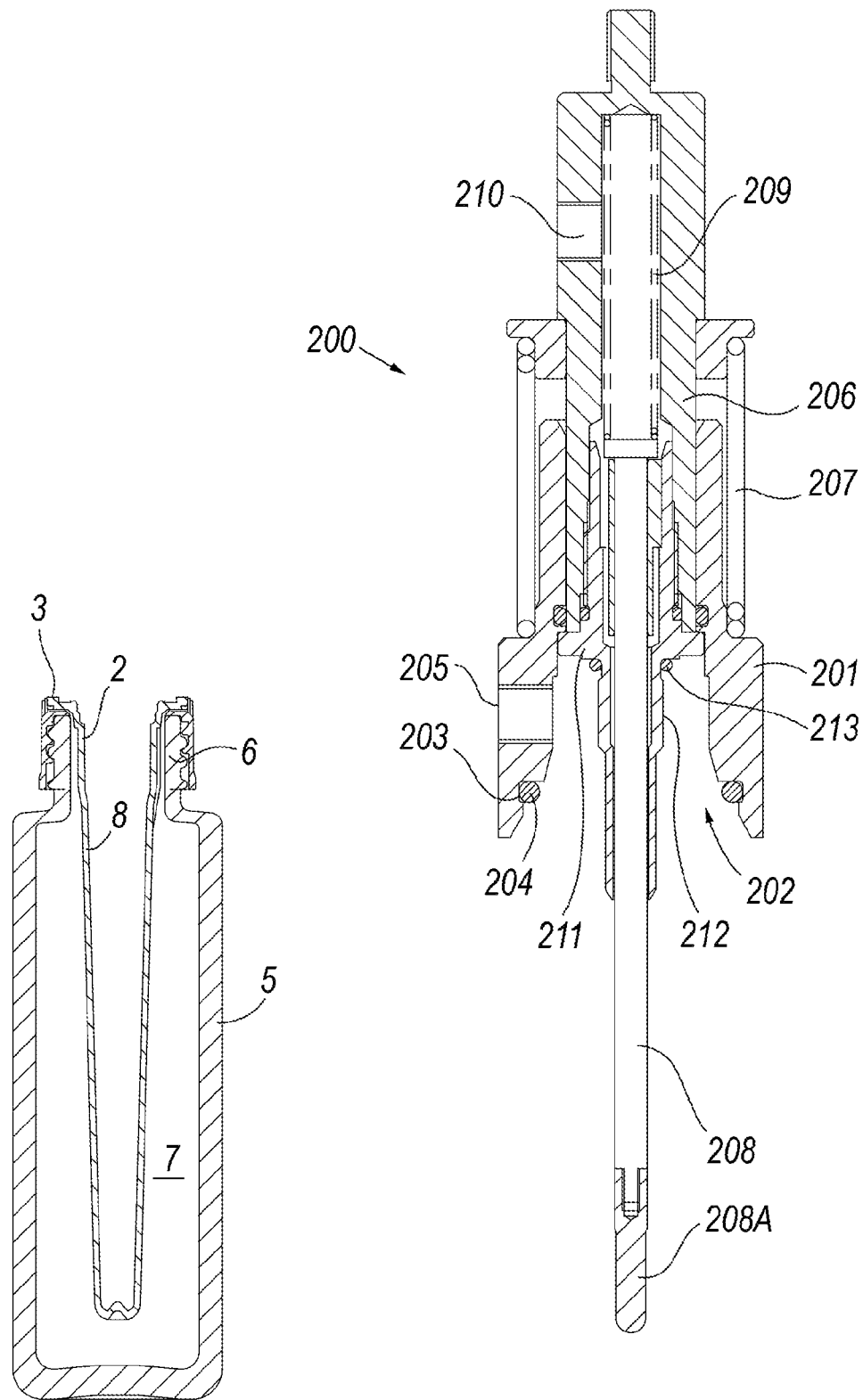
FIG. 1 shows a rigid external container, inserted into which there is a preform which forms a deformable bag when inflated.
FIG. 2 shows a blow moulding head which is coupled to the container neck to form the bag.

Reference will firstly be made to FIG. 1 which represents a first step of the method of the present invention.

Initially an external rigid body 5 is provided having a neck 6 defining an opening giving access to the body cavity 7. The neck presents an external thread 6A used to fit an airless pump (by means of a ring cap) as described hereinafter.

The body 5 is formed preferably of transparent material, such as transparent plastic or glass.

A preform 8 is provided, formed by moulding a plastic material, such as PE, PET, PP or the like, or by co-injection moulding various layers of mutually different materials. The preform 8 comprises a lowerly rounded elongated body. It also comprises a neck 2 from which a flange 3 radially extends. Teeth 2A, the use of which is clarified hereinafter, extend from the outer part of the neck.

The transverse body dimensions of the preform 8 are such that it can be freely inserted into the rigid body 5, while the preform neck 2 is profiled and has dimensions such that it easily penetrates into the hole in the neck 6 of the body 5, with the free ends of the teeth being substantially in contact with the inner surface of the hole in the neck 6, and the projecting flange 3 of the preform resting on the neck 6 via a ring cap 300 screwed onto a thread present on the neck 6.

The ring cap does not sealedly adhere to the top of the neck. In this manner, free passages form between the flange 3 of the preform neck and the end edge of the container neck 6, whereas other free passages also form (between each tooth 4 and the tooth adjacent to it) between the outer surface of the preform neck 2 and the inner surface of the hole in the neck 6 of the rigid body 5.

Essentially, the chamber 7 is in free communication with the outside.

The preform is heated to a temperature sufficient to soften (plasticize) the plastic material forming the preform. In the present method it is heated, by way of example, to a temperature of 120° C. for a time between 4 and 7 seconds.

Once heated, it is inserted into the body 5 to hence obtain a situation such as that of FIG. 1. Specifically, the preform flange 3 rests on the ring cap 300 which has been previously screwed (or otherwise fixed) to the neck 6 of the body 5.

Figure 3:
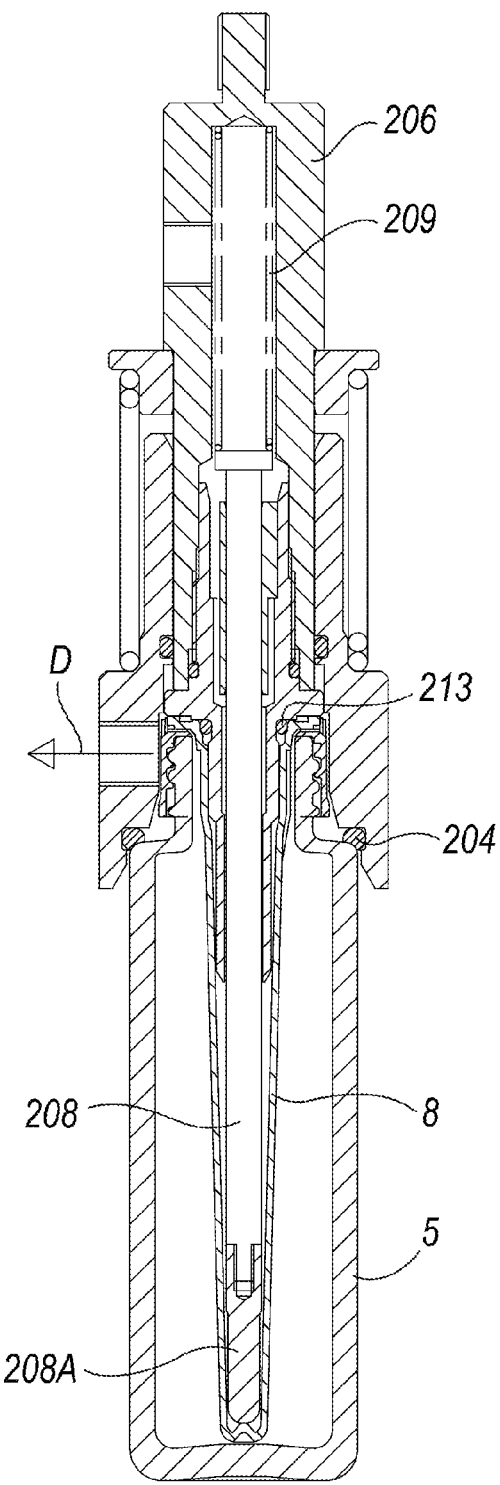

As can be seen from FIG. 3, a blow moulding head shown in FIG. 2 is associated with the container mouth.

The blow moulding head 200 comprises a profiled part 201 with a cavity 202 in its lower side (FIG. 2). The cavity is arranged to house a part of the external body 5 of the container to be formed. In particular, in those walls facing the cavity of the profiled part 201 a seat 203 is provided to house a first seal gasket 204.

The profiled part comprises an extraction port 205 communicating with a vacuum source (for example a vacuum pump). It is mounted to slide against a first spring 207 on an intermediate part 206. The intermediate part 206 has an axial cavity in which a nozzle 208 is inserted slidable against a second spring 209 and communicating with a compressed air source via an aperture.

Advantageously the nozzle is maintained axial by a flanged element sealedly coupled to the intermediate part 206.

The flanged element presents an elongated portion 212 to be inserted into the preform which has a radius similar to the internal radius of the preform neck.

On the elongated portion 212 an O-ring 213 is mounted which, when the blow moulding head is in its working position, sealedly bears against the preform.

The blow moulding head 200 is lowered onto the container (FIG. 3), and the nozzle penetrates into the preform opening. An end portion 208 thereof makes contact with the bottom of the preform 8, and as lowering proceeds the preform is stretched until it touches the base of the outer container 5.

The preform stretches gradually, given that the traction force is made homogeneous by the spring 209. Once the nozzle has touched the container base, a further lowering of the blow moulding head causes further compression of the spring 209.

Lowering proceeds until the flanged part 211 rests on the preform flange 3. The O-ring 213 seals against this latter.

While the blow moulding head is being lowered onto the container, the profiled part 201 rests against the container to compress the first spring 207. Contact between the two parts is achieved via the first gasket 204. The result is that the container interior 7 and the port 205 are in fluid-tight communication.

When in this position, the blow moulding cycle is commenced, which can be achieved in various ways.

According to a first inflation method, when the fixing head has been positioned, the vacuum source is connected to the port 205 (for example by opening a valve), with the result that the container interior 7 is put under vacuum and air is extracted therefrom (arrow D). In this condition the vacuum source is connected to the area between the preform and the internal walls of the container.

Simultaneously therewith (or immediately after), compressed air is fed (arrow P) into the nozzle 208 sealedly coupled to the neck 2 of the preform 8.

A first air jet then inflates the preform 8 such as to form a bag 8 (indicated by the same reference numeral as the preform) which at least partly occupies said body cavity. The inflation air or fluid fed into the preform interior has a pressure between 0.5 and 10 bar, depending on the preform thickness, preferably 3 bar. The vacuum present on the outside of the preform in the container facilitates bag inflation.

The blow moulding step lasts about 2-12 sec. The jet air is at ambient temperature, but can also be hotter depending on requirements.

In particular, air feed into the preform causes inflation of the bag, which adheres to the walls defining the cavity 7.

In the known art the bag inflates until the pressure of the air trapped in the interspace which forms between the bag and the walls of the cavity 7 reaches a value equal to the pressure of the air fed into the preform. In this respect, the sudden adherence of the newly formed bag to the sides of the cavity 7 creates a seal which makes it difficult for the air present in this interspace to escape outwards. Bag inflation is therefore only partial. In the known art, the bag is maintained under pressure while waiting for the air present in the interspace to seep towards the container neck, higher inflation pressures being used to accelerate air seepage.

Figure 4:
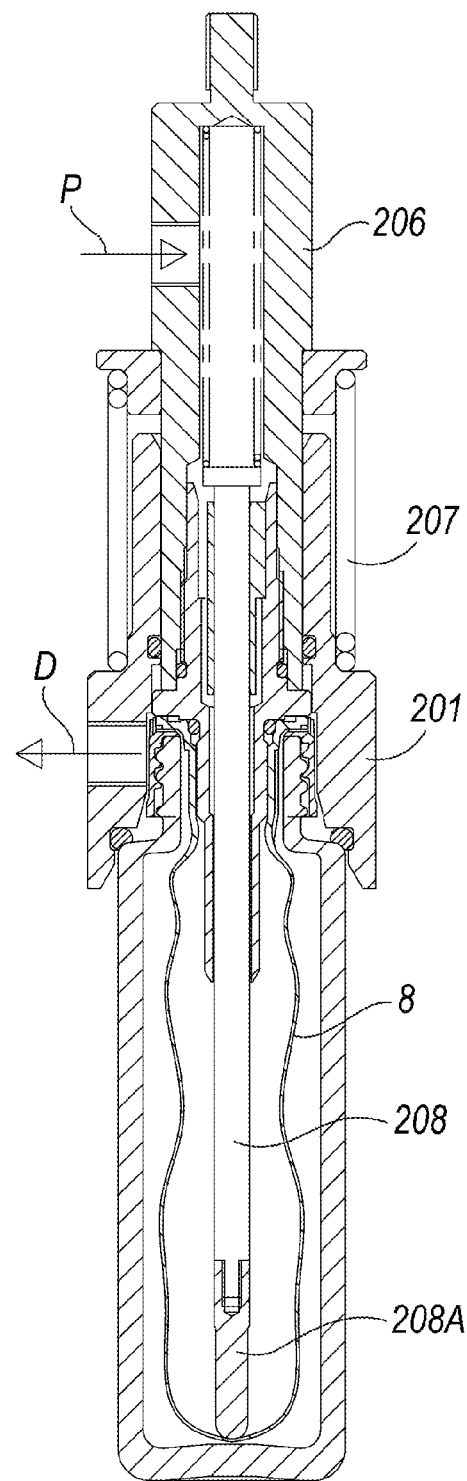
Figure 7:
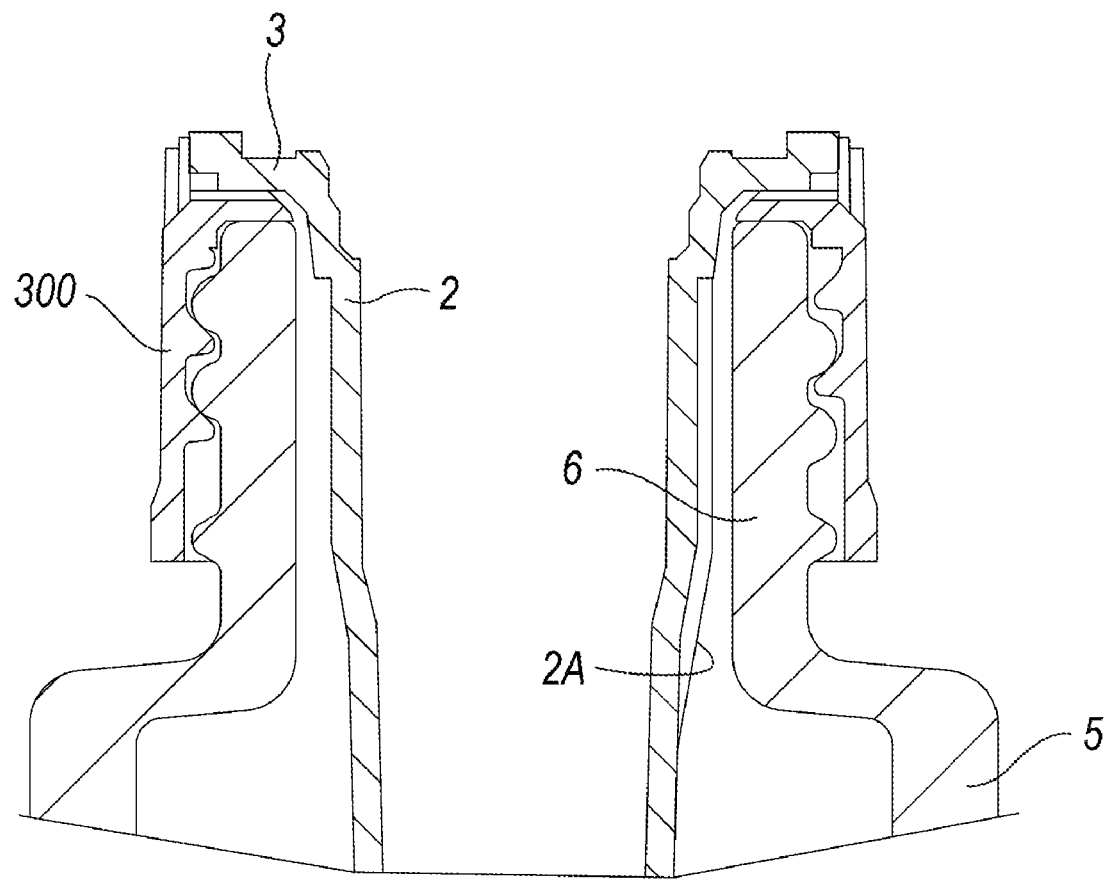
FIG. 7 shows an enlarged detail of the container of FIG. 6.

According to the present invention, as can be seen in FIG. 4, as soon as vacuum is applied, the bag "inflates" immediately in a fairly uniform manner, hence facilitating subsequent inflation by the pressure of the air fed through the nozzle. Inflation is hence facilitated by the presence of vacuum.

When the bag has been completely formed, air feed through the nozzle is halted. The valve connecting the port 205 to the vacuum source is then closed. In this condition the vacuum source is disconnected from the area between the preform and the internal walls of the container, that is no more under vacuum. The head in thus removed from the newly formed container.

According to an alternative embodiment of the inflation cycle, instead of maintaining the pressure until the bag has been completely formed, the first air jet can be interrupted to nullify the pressure within the bag (i.e. to bring it equal to atmospheric pressure). Advantageously the area between the bag and the walls defining the container cavity can also be brought to atmospheric pressure.

Any compressed air (if any) trapped between the lower part of the bag and lower part of the container squeezes the bag and detaches it from the walls defining the cavity, to seep upwards via the neck.

Nullifying the vacuum between the bag and the container facilitates rapid and immediate detachment of any bag part which may be attached to the container walls.

This procedure certainly causes the bag to substantially separate from the container inner walls. Essentially, any hypothetical adhesion of the bag to the walls defining the cavity, due for example to the temperature of the plastic material and to a sort of "gluing effect", is prevented.

After the time required to squash the bag and for the air to escape (about 0.2-0.5 seconds), a further air jet is fed into the bag, and vacuum is again advantageously applied by connecting the port 205 to the vacuum source. This time the bag 8 fills the cavity 7 to a greater extent (FIG. 4). In this respect, the air remained trapped within the interspace 7A has an initial volume less than that present between the preform and the cavity walls during the preceding step. This is because at the moment the air jet is fed (FIG. 3), the bag occupies a greater cavity volume than the preform.

As in the previous case, this further air jet is maintained for a time between 0.5 and 1 second. It is then halted and the vacuum removed, the bag deflates, and the compressed air present in the interspace 7A escapes as previously described. In this situation the bag has almost completely filled the cavity.

At this point vacuum is again applied and a final air jet is fed to completely inflate the bag. In this respect, the air surrounding the bag and trapped between this latter and the walls defining the cavity is very meagre and is almost completely sucked out by the vacuum. In the step in question the jet is maintained for a slightly longer time than for the preceding steps. This enables the small amount of air remaining in the interspace to escape or be drawn out.

On termination of this latter step the vacuum is nullified, the jet is halted and the nozzle 208 is extracted.

The bag cools at the same time and undergoes slight shrinkage due to thermal contraction, which causes it to separate in a substantially uniform manner from the walls defining the container cavity.

A bag inflation method has just been described and illustrated comprising a single air jet to inflate the bag. Applying a vacuum to the container improves bag formation.

A method has also been described comprising three inflation steps. Essentially three successive jets are fed, spaced apart by suitable pauses. During the pauses, atmospheric pressure is restored within the container. This cycle lasts about 3-5 seconds for a 30 ml vessel.

More successive jets may be required, depending on the container and bag dimensions. Essentially, the air injection step and the subsequent jet interruption to enable extraction of the air situated in the interspace outside the bag can be repeated as many times as required.

According to a yet further embodiment of the inflation cycle, the vacuum is maintained during the activation/interruption steps for the aforedescribed jets, which remain spaced apart in a manner not different from that described.

However according to the present invention, the cavity must necessarily be put under vacuum before, before and during, or simultaneously with the air feed through the nozzle. The vacuum can be nullified (and hence atmospheric or a slightly higher pressure be restored) during certain bag inflation steps.

It should be noted that the successive air jets fed into the bag after the first can have a constant pressure (for example 3 bar as indicated above), or can have a pressure which varies depending on the current inflation step. For example the first jet fed into the bag can have a lower pressure than the final maintaining jet, or vice versa. Consequently pressure regulation can be optimized, even with differences between one jet and the next, to obtain maximum possible uniformity of bag thickness.

The same discourse is valid for the vacuum to which the container interior is subjected. It has been stated that the vacuum varies between a high vacuum (less than −0.5 bar gauge) and pressure that is little less than the atmospheric pressure.

It is however important that in at least one step of the bag inflation cycle, the internal cavity of the container is put under vacuum (for example via the port 205).

The bag formed within the container interior has a substantially uniform and homogeneous thickness, in contrast to that of the methods of the known art. It is also less subject to rupture.

Moreover in the present solution the bag is detached from the walls of the container cavity. It is detached in the sense that a substantially homogeneous interspace exists at least between the lateral wall of the bag and the cavity walls, which facilitates air passage during the use of the pump.

To complete the description, it should be noted that the user receiving the container 5 with the bag 8 already inserted and retained in it (FIG. 6) introduces into the bag (through the opening in its neck 2) the desired quantity of fluid substance, which can fill the bag as far as its neck 2. The said user then inserts into the bag 8, through the opening in its neck, a manually operable pump having a dispensing stem (which projects to the outside of the bag 8 and of the container 5) and a dip tube which is immersed in the fluid substance contained in the bag.

The pump P is then locked securely onto the neck 6 of the container in known manner, for example by a further ring cap which is coupled (for example snap-fitted) to that already present on the container neck.

The further ring cap rests on the upper surface of a collar which projects radially from the pump body and presses it into sealed contact with the flange 3 of the bag 8, hence pressing the lower part of the pump into the cavity of the bag neck 2 where it forms a seal, this seal being further improved by an elastic ring positioned immediately below the collar.

In the above description the flange of the bag rests on the ring cap 300, but in an alternative embodiment it can be directly in contact with the container neck, the thread being present only on the pump locking ring cap.

The container 5 can evidently be made of any rigid or substantially rigid material (in addition to glass), for example of aluminium or other metal, or of rigid plastic.

In all cases, for correct pump operation it is important that the interspace be in contact with the external environment, for example via the described passages formed between the container neck and the bag neck, below the ring cap 300 or the flange.

Advantageously if both the ring cap and the further ring cap are present, it is very simple to extract the bag from the container when the product in its interior is consumed. In this respect, bag extraction is facilitated by unscrewing the ring cap and removing it from the container.

Advantageously, to improve bag inflatability, a lubricant film can be applied between the bag (preform) and container, enabling better inflation of the bag.

In the above description only one type of inflation head has been described. It is however evident that the inflation head can have configurations that are different from the one described. What is important is that the inflation head provides means for sealedly connect the area between the perform and the inner walls of the container interior to a vacuum source.

As described passages between the flange 3 of the preform neck and the end edge of the container neck 6 are provided.

Those passages connects the internal of the container, and in particular the area between the perform and the inner walls of the container interior, to the exterior of the container.

The inflation head, trough those passages, allows a seal connection to a vacuum source of the area between the perform and the inner walls of the container interior. In this way the area between the perform and the inner walls of the container can be connected to the vacuum source in order to apply vacuum to that area.

In the above described embodiment valve means are provided between the vacuum source and the passages so that the vacuum source can be connected or disconnected to the source when required, and in particular at least during the air jet feed in the preform. Advantageously a three way valve is provided with one way freely connected to the external environment, one way connected to the vacuum source and one way to the passages.

In a different embodiment the means for the inflation of the perform and for the application of the vacuum to the area between the perform and the inner walls of the container interior are realized trough separate devices.

The invention claimed is:

1. A production method to produce a container, the container comprising a substantially external rigid body and a bag, wherein the substantially external rigid body has a body cavity, the method comprising the steps of:
   a. providing said substantially external rigid body having a neck defining an opening giving access to the body cavity,
   b. providing a preform formed of thermoplastic material, the preform comprising a neck from which a flange radially extends,
   c. heating said preform above the softening point of the thermoplastic material,
   d. arranging the preform in the body opening,
   e. feeding into the preform interior a first air jet which inflates the preform to form said bag which at least partially occupies said body cavity, the walls of said bag being urged into contact with the walls defining said body cavity, and
   f. applying vacuum to the area between the preform and the inner walls of the container interior, to facilitate expansion of the preform to form the bag, at least during the air jet feed.

2. A method as claimed in claim 1, the vacuum is applied to the area between the perform and the inner walls of the container interior are put under vacuum by connecting this area to a vacuum source.

3. A method as claimed in claim 2, wherein the vacuum source is a vacuum pump.

4. A method as claimed in claim 3, wherein said vacuum is less than −0.5 bar gauge.

5. A method as claimed in claim 1, wherein the area between the preform and the inner walls of the container interior is put under vacuum before, during, or before and during the jet feed.

6. A method as claimed in claim 1, wherein after the step of feeding a first air jet into the preform interior, the following steps are provided:
   a. interrupting said first jet such as to enable said thermoplastic material to shrink, with its consequent detachment from the container walls, to hence allow draw-off of the air compressed by the bag expansion and trapped between the bag and the walls defining said cavity,
   b. blowing into the bag interior a final air jet, said final air jet completely inflating the bag to cause the bag to come into contact substantially with every point of at least the inner lateral surface of the cavity, and
   c. interrupting the air jet to facilitate slight shrinkage of the bag which thus at least partially separates from the cavity walls.

7. A method as claimed in claim 6, wherein after interrupting the initial air jet and while awaiting bag shrinkage, a further air jet is fed into the preform interior to further inflate the preform interior to occupy said body cavity to an even greater extent, the walls of said bag also being in this case urged into contact with the walls defining said cavity, then interrupting said further jet to enable said thermoplastic material to shrink, with its consequent detachment of said thermoplastic material from the container walls, to enable a further outflow of the air compressed by the bag expansion and trapped between the bag and the walls defining said cavity.

8. A method as claimed in claim 7, wherein the steps described in claim 7 are repeated until the bag almost completely occupies said cavity during jet feed.

9. A method as claimed in claim 1, wherein said air jet is interrupted after a time between 0.3 and 3 seconds.

10. A method as claimed in claim 1, wherein said air jet has a pressure between 2 and 6 bar.

11. A method as claimed in claim 1, wherein the preform is heated to a temperature between 100° C. and 150° C.

12. A method as claimed in claim 1, wherein the rigid body is formed of glass.

13. A method as claimed in claim 1, wherein the preform/bag is formed of polyethylene terephthlate and/or polyethylene and/or polypropylene and/or by co-injection moulding various layers.

14. A method as claimed in claim 1, wherein the container interior is put under vacuum and returned to substantially atmospheric pressure in cyclic steps, in accordance with the state of feed of the air jet into the bag interior.

* * * * *